(12) United States Patent
Zhang et al.

(10) Patent No.: US 12,166,986 B2
(45) Date of Patent: Dec. 10, 2024

(54) ADAPTIVE QUALITY BOOSTING FOR LOW LATENCY VIDEO CODING

(71) Applicant: Intel Corporation, Santa Clara, CA (US)

(72) Inventors: Ximin Zhang, San Jose, CA (US); Changliang Wang, Bellevue, WA (US); Sang-hee Lee, San Jose, CA (US); Keith Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 17/121,284

(22) Filed: Dec. 14, 2020

(65) Prior Publication Data
US 2021/0136378 A1    May 6, 2021

(51) Int. Cl.
*H04N 19/124*    (2014.01)
*H04N 19/119*    (2014.01)
*H04N 19/167*    (2014.01)
*H04N 19/172*    (2014.01)

(52) U.S. Cl.
CPC ......... *H04N 19/124* (2014.11); *H04N 19/119* (2014.11); *H04N 19/167* (2014.11); *H04N 19/172* (2014.11)

(58) Field of Classification Search
CPC .. H04N 19/124; H04N 19/119; H04N 19/167; H04N 19/172
See application file for complete search history.

(56) References Cited

U.S. PATENT DOCUMENTS

| | | | |
|---|---|---|---|
| 2013/0114715 A1 | 5/2013 | Srinivasan et al. | |
| 2015/0181240 A1* | 6/2015 | Aoki | H04N 19/107 375/240.12 |
| 2017/0013274 A1* | 1/2017 | Sadhwani | H04N 19/107 |
| 2017/0099491 A1* | 4/2017 | Lei | H04N 19/172 |
| 2017/0214938 A1* | 7/2017 | Zhang | H04N 19/177 |
| 2020/0396501 A1* | 12/2020 | Lapicque | H04N 21/2343 |
| 2022/0021887 A1* | 1/2022 | Banerjee | H04N 19/115 |

FOREIGN PATENT DOCUMENTS

| | | |
|---|---|---|
| WO | 2005091632 | 9/2005 |
| WO | 2010069427 | 6/2010 |
| WO | 2017007606 | 1/2017 |

OTHER PUBLICATIONS

Extended European Search Report for European Patent Application No. 21198743.3 dated Mar. 22, 2022.

* cited by examiner

*Primary Examiner* — Kyle M Lotfi
(74) *Attorney, Agent, or Firm* — Akona IP PC

(57) ABSTRACT

Techniques related to adaptive quality boosting for low latency video coding are discussed. Such techniques include segmenting each of a number of temporally adjacent video frames into unique high encode quality regions and encoding each of the video frames by applying a coding quality boost to the high encode quality regions relative to other regions of the video frames.

22 Claims, 9 Drawing Sheets

ADAPTIVE QUALITY BOOSTING FOR LOW LATENCY VIDEO CODING

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In some video encoding contexts, including video conferencing and videotelephony, real-time video streaming is employed. Such real-time video streaming, in particular, is an important internet video application. With the recent emergence of cloud video gaming, real-time video streaming has become even more important. In all such applications, encoding and sending video with low latency is a necessity to provide the expected user experience, particularly for applications that require user interaction. Currently, a video encoder is responsible to encode video with an average bit rate (or average frame size) that reflects the estimated network bandwidth. For each frame, the encoded frame size is limited to a small range around the average frame size. Due to this limitation, the encoded video quality drops when a scene change occurs and gradually increases to a converged to a stable quality over time. However, given the frame size limitation, the converging speed is slow and the stable quality is often stuck at a non-optimal standard quality.

It may be advantageous to improve video quality in such low latency contexts. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
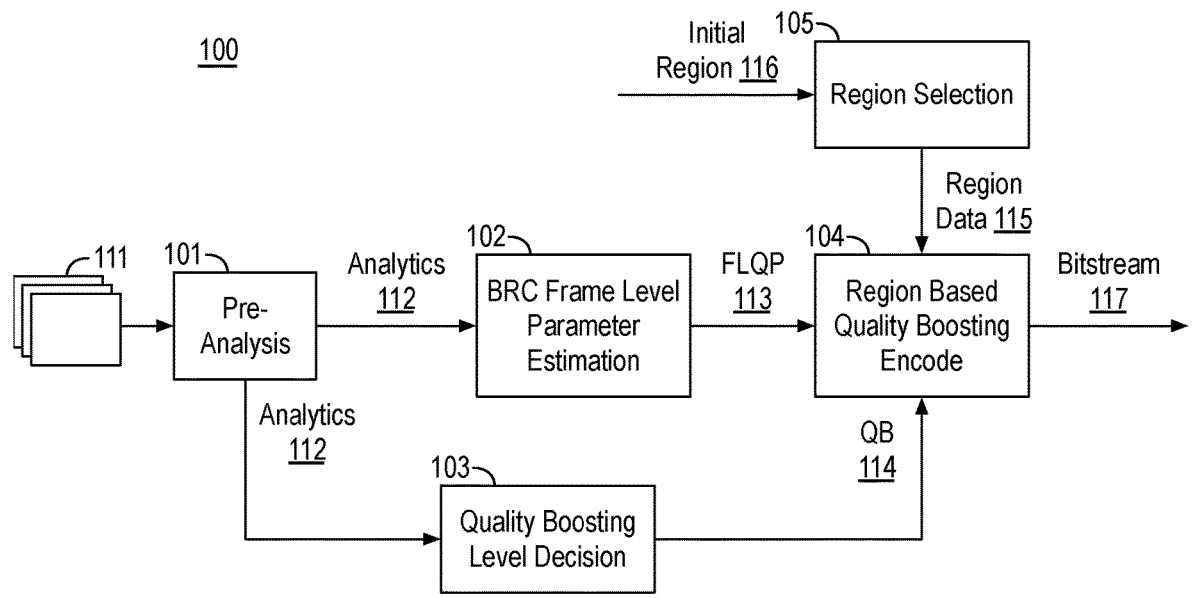
FIG. 1 is an illustrative diagram of an example system for low latency video coding including applying moving high quality encode regions across temporally adjacent video frames.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to adaptive quality boosting for low latency video coding and, in particular, to applying a quality boost to different frame portions over time for improved video quality.

As described above, in some video encode contexts, low latency encoding is needed. As used herein, the term low latency indicates low delay encode with very limited frame encode time constraints such as less than a 100 ms encode time for each frame. In such low latency encode, an average bit rate (or average frame size) may be used such that each frame must be encoded using a frame size that is within a particular difference (such as less than 5%) from the average frame size. As used herein, the terms average bit rate and average frame size indicate a number of resultant bits after encode of a particular portion of video such as a frame. Also as discussed above, such constraints in terms of low latency and adherence to an average frame size cause video quality drops at scene change or intra frames. Importantly, even after the scene change or intra frame, as video quality improves, the improvement is still constrained to a slow improvement and an ultimate quality level that is below a desired quality level. As used herein, the term video quality and similar terms indicate objective and/or subjective quality of a video frame or sequence as decoded from an encoded bitstream. Furthermore, the term scene change or intra frame indicates a frame encoded using only pixel samples from that frame (i.e., without reference to any other frames). The term scene change may also indicate a change in the content of the video from the frames prior to the scene change frame.

To address these problems and constraints, the techniques discussed herein provide an adaptive rolling region(s) quality boosting to achieve faster quality convergence and a better stable quality with an improved visual experience. Notably, the discussed techniques provide both faster quality improvement and a higher ultimate quality level. In some embodiments, each frame of a number of temporally adjacent frames are segmented into high and standard quality encode regions. Herein, the term high quality encode region indicates a region that is to include a coding quality boost during encode such that the region may be decoded to generate higher quality video. The term standard quality region indicates a region that does not employ a coding quality boost and is standard quality relative to such high quality encode regions and/or relative to an unmodified encode of the frame. In some embodiments, the standard quality encode regions are encoded unmodified and high quality encode regions are quality boosted as discussed herein. In some embodiments, in addition to the high quality encode regions being quality boosted, the standard quality encode regions also have reduced quality. In any event, standard quality encode may also be characterized as low quality encode, regular quality encode, unmodified quality encode, or the like.

The term coding quality boost indicates the corresponding regions receive more bits or more available bits for encode relative to the standard quality regions. Such application of more bits or more available bits may be employed using any suitable technique or techniques. In some embodiments, a quantization parameter (QP) delta is applied in the high quality encode regions to lower the QP in such regions. For example, a frame level QP for a frame may be reduced to a reduced QP, which is applied in the high quality encode regions, while the standard quality encode regions apply the frame level QP. In some embodiments, applying the quality boost includes adjusting the rate distortion optimization in the high quality encode regions relative to the standard quality encode regions such that more bits are used. For example, in some rate distortion optimization (RDO) context, a lower lambda value may be used such that bitrate is not punished as much relative to distortion in the optimization.

The segmentation of the temporally adjacent frames into high and standard quality encode regions provides for movement of the high quality encode regions across the frames and over time. Thereby, different regions of frames are boosted as processing continues. Such high quality encode regions may have any shapes such as a single horizontal strip, multiple horizontal strips, multiple rectangular regions that define a pattern, or the like. Across the temporally adjacent frames the high quality encode regions are moved such that, over a particular number of frames, an entirety of a video frame size is filled or covered by the high quality encode regions. For example, given a full frame size, a composite of the high quality encode regions covers the full frame size with or without overlap among the high quality encode regions. Furthermore, in some embodiments, a high quality encode region in each of the temporally adjacent frames has a portion that is unique relative to the high quality encode region(s) of the temporally adjacent frames. For example, the high quality encode regions among frames move to cover unique and previously uncovered regions of the full frame size.

In some embodiments, the coding quality boost applied to a particular frame is adaptive. For example, the coding quality boost may be adaptive to a measured temporal correlation of a frame with a higher coding quality boost provided when the frame has a higher temporal correlation. In some embodiments, a scene change or intra frame (having no temporal correlation) uses a predefined coding quality boost such as a predetermined QP reduction for the high quality encode regions thereof. For subsequent frames, the temporal correlation may be measured using any suitable technique or techniques and used to adjust the coding quality boost. In some embodiments, a higher QP reduction is used when higher temporal correlation is detected and a lower QP reduction is detected is used when higher QP reduction is detected. Although discussed with respect to QP adjustments, in some embodiments, such coding quality boost levels may be employed via rate distortion optimization adjustments. Multiple temporal correlation thresholds and corresponding coding quality boost may be used.

In some embodiments, video pre-analysis statistics are first analyzed and according to estimated temporal correlation, an adaptive boost value is determined for the current frame. The boost value is then applied to a set of selected regions (i.e., high quality encode regions) of the current frame. Such selected regions are periodically rolling from frame to frame such that each frame will be boosted in different regions and the whole frame is covered after a period of frames. Such periodic region selection may be continued again and again after the whole frame is covered whether or not a scene change or intra frame is employed. Furthermore, although discussed with respect to rolling high quality encode regions, in some embodiments, the regions skip around the frame. In some embodiments, the location and/or size of the high quality encode region is selected randomly for the current frame. The discussed techniques offer low complexity of implementation, relative ease of integration, and significant quality improvements (e.g., up to 2 db for long periods of stable display and 0.4 db in average).

FIG. 1 is an illustrative diagram of an example system 100 for low latency video coding including applying moving high quality encode regions across temporally adjacent video frames, arranged in accordance with at least some implementations of the present disclosure. As shown in FIG. 1, system 100 includes a pre-analysis module 101, bit rate control frame level parameter estimation module 102, a quality boosting level decision module 103, a region based quality boosting encode module 104, and a region selection module 105.

As shown, system 100 receives input video 111 for coding and system 100 provides video compression to generate a bitstream 117 such that system 100 may be a video encoder implemented via a computer or computing device or the like. As discussed further herein, system 100 provides moving high quality encode regions and corresponding coding quality boosting levels or values for improved low latency video having faster quality improvement across video frames of input video 111 and a higher stable quality level. Bitstream 117 may be any suitable bitstream such as standards compliant bitstream. For example, bitstream 117 may be AVC (Advanced Video Coding) standards compliant, HEVC (High Efficiency Video Coding) standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, region based quality boosting encode module 104 (and pre-analysis module 101) may include one or more of a partition module, a transform module, a quantization module, an intra prediction module, a motion estimation module, a motion compensation module, a scanning module, an entropy encode module, etc. Furthermore, region based quality boosting encode module 104 may include a local decode loop including an inverse quantization module, an inverse transform module, and an adder for combining reconstructed residual blocks with reference blocks, a deblock filtering module, a sample adaptive offset (SAO) filtering module, etc. Such modules and the operations associated therewith are known to those of skill in the art and are not discussed further herein for the sake of clarity in presentation.

As discussed, system 100 receives input video 111. Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames and blocks for the sake of clarity of presentation. However, such frames may be characterized as pictures, video frames or pictures, sequences of frames or pictures, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

Figure 2:
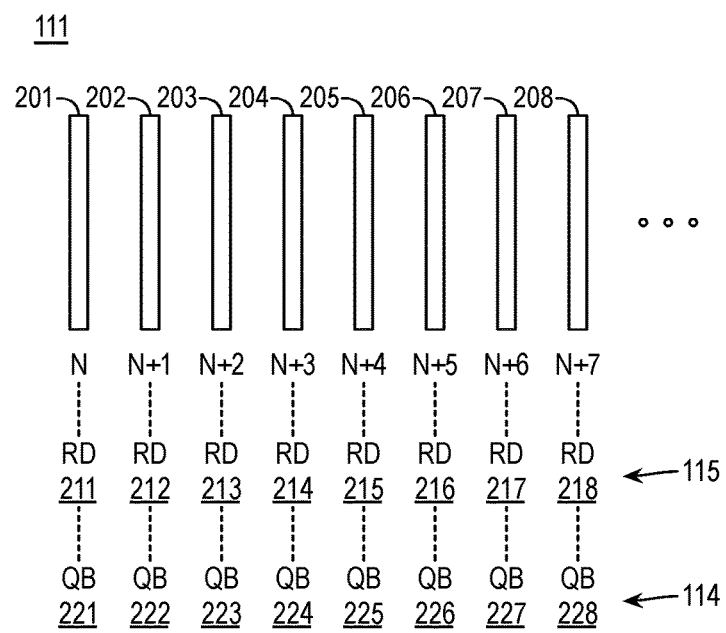
FIG. 2 is an illustrative diagram of example input video and corresponding region data and quality boosting levels for each frame of the input video.

FIG. 2 is an illustrative diagram of example input video 111 and corresponding region data and quality boosting levels for each frame of input video 111, arranged in accordance with at least some implementations of the present disclosure. As shown in FIG. 2, input video 111 includes a number of temporally adjacent frames 201-208 (N to N+7). As used herein, the term temporally adjacent indicates the frames are near one another in a temporal presentation order (e.g., the temporal order). The term immediately temporally adjacent indicates frames that are in the temporal presentation order and have no intervening frames therebetween. Furthermore, in FIG. 2, the relative heights of frames 201-208 being about the same indicates that, in the context of low latency video coding for example, frames 201-208 each have a target bit rate or frame size that is approximately the same. In some embodiments, the target bit rate or frame size is an average target bit rate or frame size that corresponds to an available channel bandwidth for the transmission of bitstream 117. In some contexts, system 100 provides a bit rate or frame size for each of temporally adjacent frames 201-208 that is within a close range of the target bit rate or frame size such as within 5% of the target, 2% of the target, or 1% of the target. For example, input video 111 may be encoded to bitstream 117 for use in the context of video conferencing, videotelephony, cloud gaming, or other low latency applications.

Also as shown, each of temporally adjacent frames 201-208 has corresponding region data (RD) 211-218 and a corresponding quality boost (QB) level or value 221-228. For example, region data 211-218 may define a size and location of one or more regions in each of temporally adjacent frames 201-208 to which a quality boost is to be applied. Furthermore, each quality boost level or value 221-228 indicates the quality boost for the regions defined by region data 211-218. Although discussed with respect to high quality regions of a frame having the same quality boost level or value, in some embodiments, different quality boost levels or values to different high quality regions of the same frame.

Returning to FIG. 1, pre-analysis module 101 receives input video 111 and pre-analysis module 101 generates, if applicable, analytics data 112 such that analytics data 112 includes at least a temporal correlation value for the frame. As shown, analytics data 112, if available, is provided to bit rate control frame level parameter estimation module 102 for generation of a frame level QP (FLQP) 113 for the frame and to quality boosting level decision module 103 for generation of a quality boost level or value (QB) 114 for the frame. Quality boost level or value 114 may be any suitable value or data structure to indicate the differential encode to be applied to the high quality encode region(s) of the frame. In some embodiments, quality boost level or value 114 is a delta QP (e.g., QP reduction value) to be employed for the high quality encode region(s). In some embodiments, quality boost level or value 114 is a boosting level or rank (e.g., a value of 1 for the highest boosting, 2 for next highest, and so on) for the high quality encode region(s). Such levels or ranks may be employed during encode using any suitable technique or techniques such that more bits are allocated to the high quality encode region(s) relative to other regions of the frame. In some embodiments, the encode adjusts the rate distortion optimization to provide more bits to the high quality encode region(s). In some embodiments, such rate distortion optimization adjustment is employed using a reduction to a lambda value (e.g., delta lambda) used to perform rate distortion optimization for the high quality encode region(s).

It is noted that bit rate control frame level parameter estimation module 102 and quality boosting level decision module 103 may receive data other than analytics data 112, as needed, for the generation of frame level QP 113 and quality boost level or value 114, respectively, such as frame type, target bitrate or frame size, etc.

In some embodiments, a temporal correlation value is not determined for a frame such as when the frame is a scene change or intra frame to be encoded using only pixel data from the frame itself. In such contexts, a predefined quality boost may be used for the scene change or intra frame. In examples where a QP reduction is used, a QP reduction value of four or five may be used. A scene change or intra frame may be defined or detected using any suitable technique or techniques such as use of a predefined group of pictures coding structure, deployment of a scene change detector, etc. For example, with reference to FIG. 2, in examples where frame 201 is a scene change or intra frame (e.g., defined using predefined group of pictures coding structure, quality boost level or value 221 may be provided as a predefined quality boost level or value in response to frame being a scene change or intra frame.

With reference to FIG. 1, for non intra or scene change frames, a temporal correlation value is generated as part of analytics data 112. The temporal correlation may be generated using any suitable technique or techniques and may include any value that indicates temporal correlation between a current frame and one or more temporally previous frames. In some embodiments, the temporal correlation value is generated based on a number of skip blocks from a previously decoded frame. For example, with reference to FIG. 2, in cases where frame 202 was previously encoded and encode statistics for frame 202 are available, a temporal correlation value for frame 203 may be a proportion, percentage, or number of skip blocks in frame 202 (i.e., a value indicative of a number skip blocks in an immediately temporally previous frame). Notably, in the context of low latency encode, a look ahead analysis for frame 203 is not available and prior relevant statistics may be used. It is noted that as more encode statistics become available, for a current frame such as frame 208, the number of skip blocks or other temporal correlation indicator from additional prior frames (e.g., any frames 207, 206, 205, and so on) may be used. For example, the number of skip blocks or other temporal correlation indicator for multiple frames may be averaged, a median filter may be applied, etc.

In some embodiments, the temporal correlation value is generated based on a difference between a current frame and an immediately temporally previous frame. The difference may be generated using any suitable technique or techniques such as a sum of absolute values of pixel wise differences, a sum of squares of pixel wise differences, or the like. The difference may be between immediately adjacent frames or downsampled versions thereof. For example, with reference to FIG. 2, a temporal correlation value for frame 203 may be generated by comparing frame 203 to frame 202, a temporal correlation value for frame 204 may be generated by comparing frame 204 to frame 203, and so on. As with other statistics, as frame differences are accumulated for several prior frames, they may be averaged, median filtered, etc. to determine a temporal correlation value for a current frame such as frame 208.

Figure 3:
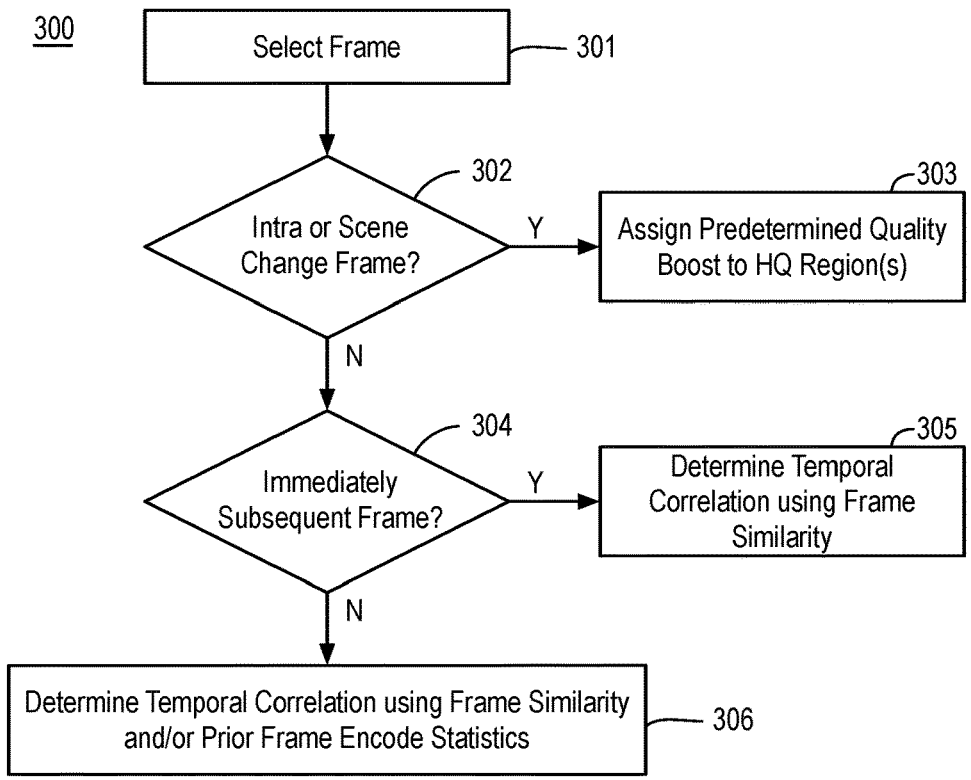
FIG. 3 is a flow diagram illustrating an example process for determining a temporal correlation for a frame for use in defining a quality boosting level or value.

FIG. 3 is a flow diagram illustrating an example process 300 for determining a temporal correlation for a frame for use in defining a quality boosting level or value, arranged in accordance with at least some implementations of the present disclosure. Process 300 may include one or more operations 301-306 as illustrated in FIG. 3. Process 300 may be performed by pre-analysis module 101 of system 100, for example, to determine a temporal correlation value for a frame.

Process 300 begins at operation 301, where a frame of input video 111 is selected for processing. For example, temporally adjacent frames 201-208 may be processed in a temporal order corresponding to a display order thereof. Processing continues at decision operation 302, where a determination is made as to whether the frame selected at operation 301 is a scene change or an intra frame. Such a determination may be made using any suitable technique or techniques. In some embodiments, a group of pictures structure is applied to input video 111 such that an intra frame is provided periodically in the frame structure. In some embodiments, scene change detection is used. In some embodiments, such scene change detection includes comparison of each frame to a temporally prior frame and indication of a scene change frame when the difference (e.g., a sum of pixel wise absolute value differences, a sum of squares of pixel wise absolute value differences, etc.) exceeds a threshold.

When the frame is a scene change frame or an intra frame, processing continues at operation 303, where no temporal correlation value is determined for the scene change or intra frame and a predetermined quality boost is applied (as discussed above) to high quality encode regions of the scene change or intra frame When the frame is not a scene change frame nor an intra frame, and the frame is to encoded using a reference frame (e.g., using motion estimation and compensation), processing continues at decision operation 304, where a determination is made as to whether the current frame is immediately subsequent to the scene change or intra frame. Notably, if the current frame is immediately subsequent to a scene change or an intra frame, no motion estimation was made for the immediately prior frame.

When the frame is immediately subsequent to a scene change or intra frame, processing continues at operation 305, where a temporal correlation value is determined for the current frame using a frame similarity between the current frame and the scene change or intra frame. The frame similarity of difference measure may be any suitable measure. In some embodiments, the frame similarity of difference measure is a sum of absolute values of pixel wise differences between the current frame and the scene change or intra frame. In some embodiments, the frame similarity of difference measure s a sum of squares of pixel wise differences between the current frame and the scene change or intra frame. In such contexts, lower values indicate higher temporal correlation between the frames. Such values may be determined using the frames or downsampled versions thereof. Furthermore, such temporal correlation values may be inversed or scaled to provide higher temporal correlation values corresponding to higher temporal correlation.

When the frame is not immediately subsequent to a scene change or intra frame processing continues at operation 306, where a temporal correlation value is determined for the current frame using a frame similarity between the current frame and one or more prior frames and/or using encode statistics for the one or more prior frames. In examples where frame similarity is used, the frame similarity of difference measure may be determined using any techniques discussed with respect to operation 305. In examples, where encode statistics for one or more prior are used, the encode statistics may be any statistics indicate of temporal correlation. Notably, the encode statistics are from encode of the prior one or more frames. In some embodiments, the encode statistics include a number, percentage, or proportion of skip blocks in the prior one or more frames. In such examples, higher values indicate higher temporal correlation between the frames. In some embodiments, both techniques may be used and they may be combined to form a temporal correlation measure. For example, the temporal correlation measure may be a linear combination of the number, percentage, or proportion of skip blocks and an inverse of the frame difference. The resultant temporal correlation measure may also optionally be scaled.

Figure 4:
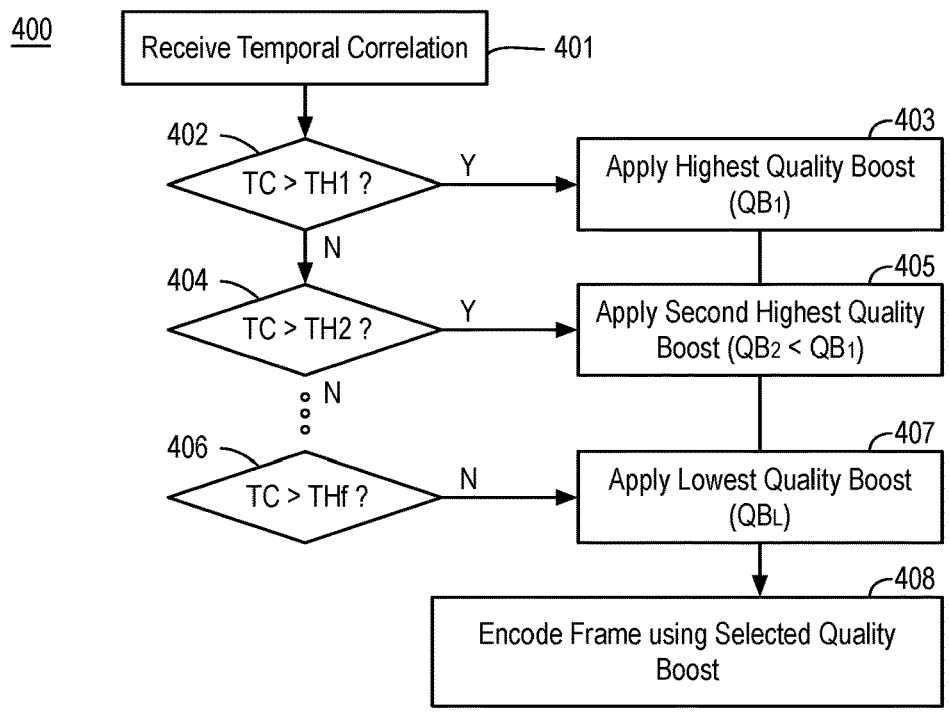
FIG. 4 is a flow diagram illustrating an example process for determining quality boosting level or value for a frame using a temporal correlation for the frame.

As discussed, the resultant temporal correlation (for frames other than scene change or intra frames) is then used to determine a coding quality boost for high encode quality region(s) of the frame. In the context of FIG. 4, it is assumed the temporal correlation is employed such that higher temporal correlation values indicate higher temporal correlation as discussed above. In examples where lower temporal correlation values indicate higher temporal correlation, other thresholds may be used and the comparison to the threshold may be reversed (i.e., <is used in place of>).

FIG. 4 is a flow diagram illustrating an example process 400 for determining quality boosting level or value for a frame using a temporal correlation for the frame, arranged in accordance with at least some implementations of the present disclosure. Process 400 may include one or more operations 401-408 as illustrated in FIG. 4. Process 400 may be performed by quality boosting level decision module 103 of system 100, for example, to determine a quality boosting level or value for a frame.

Process 400 begins at operation 401, where a temporal correlation value for a frame is received. The temporal correlation value for the frame may be any temporal correlation value discussed herein. Processing continues at decision operation 402, where a determination is made the temporal correlation value is greater than a first threshold (TH1). If so, processing continues at operation 403, where a highest quality boost ($QB_1$) is employed for high quality encode region(s) of the current frame. In some embodiments, the highest quality boost corresponds to a greatest reduction (e.g., about six) in QP for the high quality encode region(s). In some embodiments, the highest quality boost corresponds to a largest rate distortion optimization adjustment to provide more bits for the high quality encode region(s). Other encode quality boost techniques may be used such that the boost provided at operation 403 is the largest or highest available.

If the temporal correlation value is not greater than the first threshold, processing continues at decision operation 404, where a determination is made the temporal correlation is greater than a second threshold (TH2) that is less than the first threshold (TH2<TH1). If so, processing continues at operation 405, where a second highest quality boost ($QB_2$) is employed for high quality encode region(s) of the current frame. In some embodiments, the second highest quality boost corresponds to a second greatest reduction (e.g., four or five) in QP for the high quality encode region(s). In some embodiments, the second highest quality boost corresponds to a second largest rate distortion optimization adjustment to provide more bits for the high quality encode region(s). Other encode quality boost techniques may be used such that the boost provided at operation 403 is the second e largest or highest available.

If the temporal correlation value is not greater than the second threshold, processing continues in a like manner through decision operation 406 and operation 407 using any number of thresholds (descending in values) and corresponding encode region based quality boost levels (also descending in amount of boost provided). In some embodiments, three overall encode region based quality boost levels are used. In some embodiments, four overall encode region based quality boost levels are used. In some embodiments, five overall encode region based quality boost levels are used. As discussed, in some embodiments, each encode quality boost level uses a corresponding QP reduction. In some embodiments, a highest level reduces QP by six, a second highest level reduces QP by four or five, a third highest level reduces QP by three or four, and a fourth highest level reduces QP by one or two.

At decision operation 406, a determination is made that the temporal correlation does not exceed a final threshold (THf) and, in response thereto, processing continues at operation 407, where a lowest quality boost level ($QB_L$) is used for the current frame. For example, quality boosting may be applied for high encode quality regions of all frames. Processing continues at operation 408, where the current frame is encoded using the selected quality boost level. For example, the selected quality boost is applied to the high quality encode region(s) of the frame and no change may be made to the remaining region(s) of the frame.

Returning to FIG. 1, as discussed, quality boosting level decision module 103 determines quality boost level or value 114 for each frame of input video 111. In general, a smaller boosting level or value is used for frames (or clips) with higher motion (e.g., lower temporal correlation) and a larger boosting level or value is used for frames (or clips) with smooth or close to zero motion. In some embodiments, when no pre-analysis is available, a fixed quality boost level or value 114 is used for all frames of input video 111.

Discussion now turns to region selection via region selection module 105. As shown, region selection module 105 may include an initial region 116 for deployment in a temporally first frame of input video 111. Initial region 116 may be defined using any suitable data structure such as data indicating a boundary within a frame of input video 111. In some embodiments, one or more combinations of a top left corner (e.g., x, y position) and a size (horizontal or x-dimension size (width) and vertical or y-dimension size (height)) may be used to define one or more rectangles within a frame of input video 111. Such one or more rectangles may then define a high quality encode region while remaining region(s) define standard quality encode regions. In some embodiments, initial region 116 is not employed.

For subsequent frames or all frames, region selection module 105 generates region data 115, which may include the same or similar data structures with respect to initial region 116 to define high quality encode region(s) in the frames of input video 111. Region data 115 includes such data for some or all video frames of input video 111. Notably, region selection module 105 may define one or more high quality encode regions within each of a number temporally adjacent video frames such that at least a portion of one region in each frame is unique with respect to high quality encode regions of the other temporally adjacent video frames. That is, the high quality encode regions shift or move from one frame to another.

In addition, across a certain number of temporally adjacent video frames such as 8, 10, 12, or more frames, the sum of the high quality encode regions within the temporally adjacent video frames fill an entirety of a video frame size of the temporally adjacent video frames. For example, after a certain number of frames, the entirety of the frame has been boosted. As used herein, the term video frame size indicates a common size among the temporally adjacent video frames and the term to fill or cover or the like indicates that the regions when summed or overlaid onto a frame template cover the video frame size.

Such high quality encode region(s) may be any suitable size and shape. In some embodiments, the high quality encode region(s) within a frame cover not more than 20% of the total are of the frame. In some embodiments, the high quality encode region(s) within a frame cover not more than 15% of the total are of the frame. In some embodiments, the high quality encode region(s) within a frame cover 8% to 15% of the total are of the frame. Other frame coverage percentages may be used. Such frame regions may be maintained at constant coverage percentage across the frames or the proportion of the frames that are high quality encode region(s) may change. In some embodiments, the proportion of the frames that are high quality encode region(s) reduces over the frames.

In some embodiments, the high quality encode regions include a number of horizontal strips across a width of the video frame. In some embodiments, each strip is the size of a macroblock or largest coding unit of the video frame. In some embodiments, a single high quality encode region strip having a height of multiple macroblocks or largest coding units is used in each frame. In some embodiments, each frame has a number of regions that combine to form a high quality encode region. Other shapes such as vertical strip(s), diagonal strip(s), or the like may be used.

In some embodiments, the size or shape or both of the high quality encode region(s) are randomly selected for one or more frames. Such techniques may advantageously reduce visually detectable patterns in the visual quality. In some embodiments, for an Nth frame in an encode or display order, the randomly selected size and or shape are selected from a set of available sizes and or shapes. For example, a number of predefined high quality encode region(s) sets may be employed and, at each frame, one of the sets is employed for use and then eliminated from the pool of available sets for selection in a next frame.

As discussed, region selection module 105 selects a subset of a frame to have boosted quality. The locations of the selected regions move from frame to frame across the encode or display order of the frames such that the whole frame is covered after a certain number of frames (e.g., a period). After the period or certain number of frames, the discussed region selection continues and repeats for another certain number of frames such that for each period of frames (of the same or different number of frames), the whole frame is covered by the moving high quality encode region(s). Each period of multiple frame may employ the same region patterns or they may be different.

Figure 5:
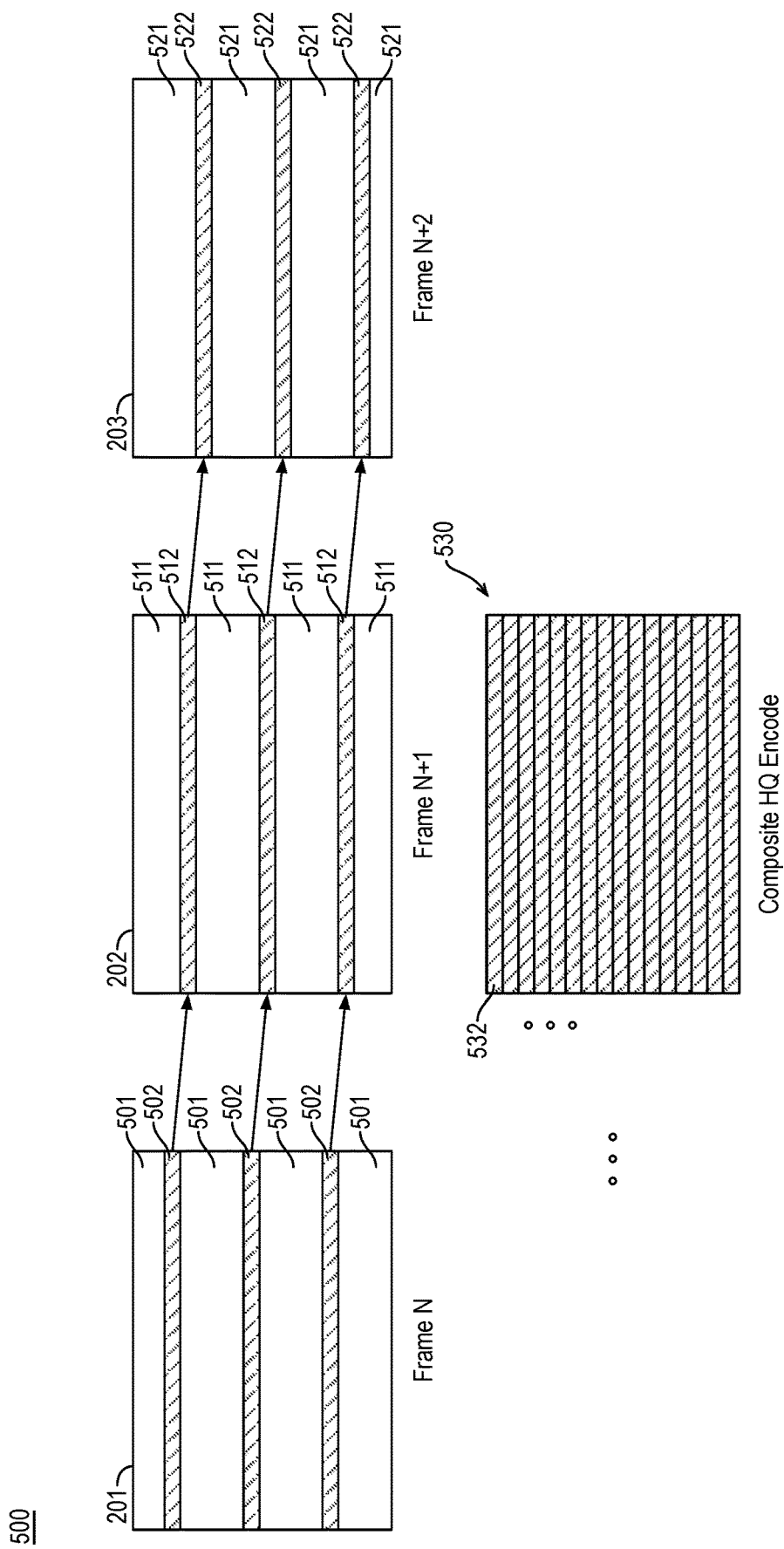
FIG. 5 is an illustrative diagram of an example high quality encode region movement across frames for use in low latency video coding.
Figure 6:
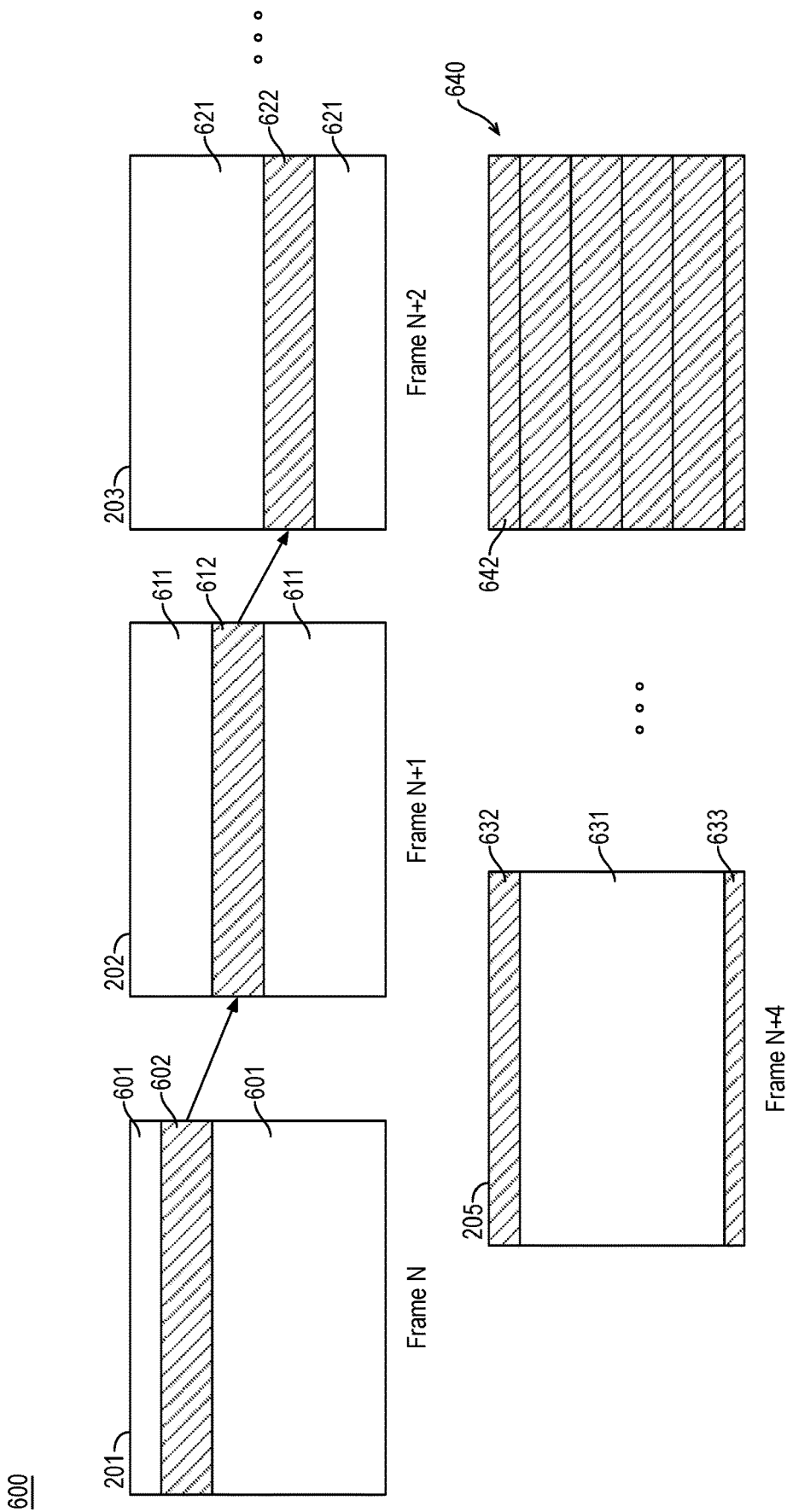
FIG. 6 is an illustrative diagram of another example high quality encode region movement across frames for use in low latency video coding.
Figure 7:
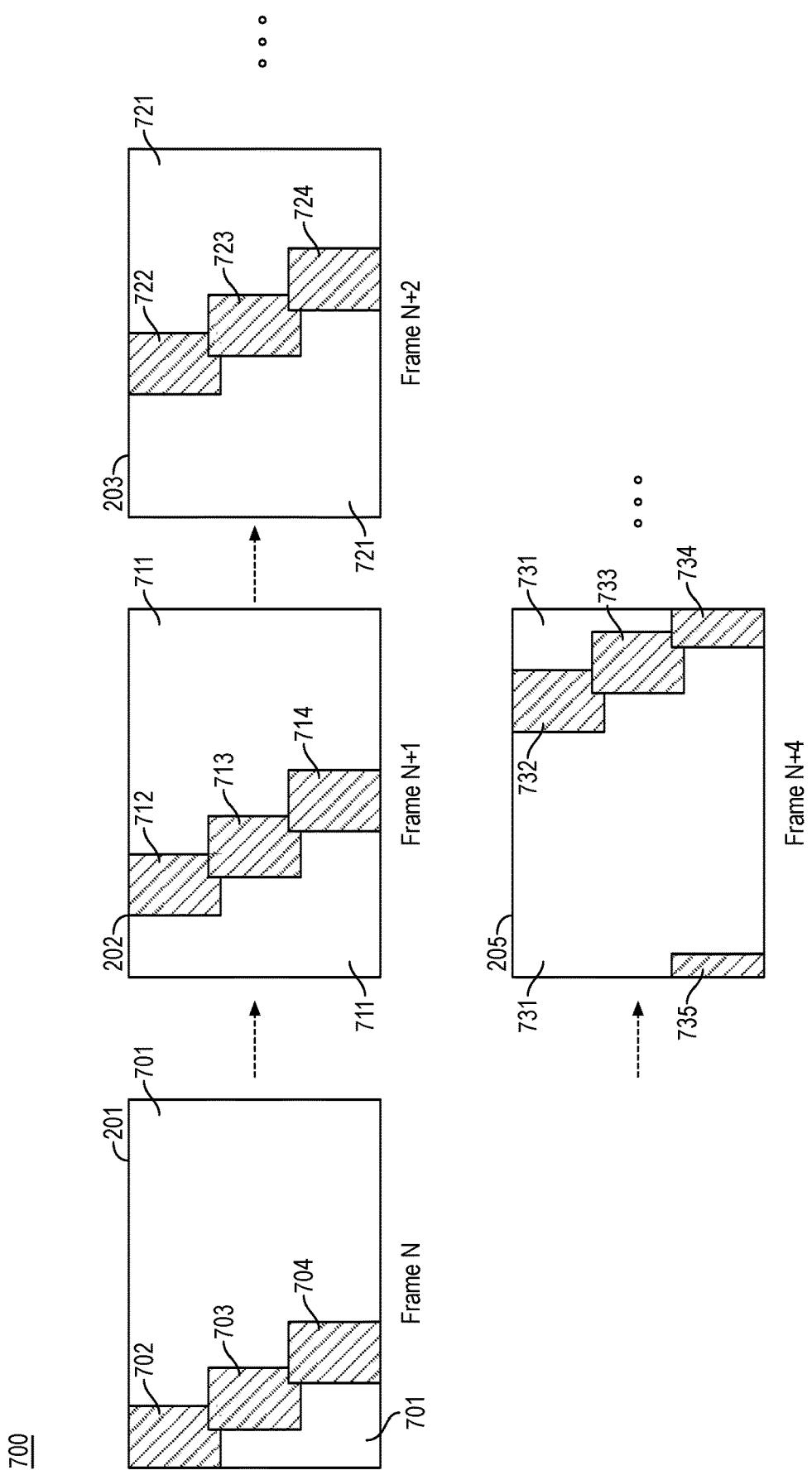
FIG. 7 is yet another illustrative diagram of another example high quality encode region movement across frames for use in low latency video coding.

Notably, the basic principle of boosting regions selection is to select a subset region of each frame and change the locations (and/or sizes) from frame to frame such that the whole frame will be covered after a certain number of frames. Any region(s) shape(s) and shifting movements may be used as long as this principle is satisfied. For example, the subset region(s) for high quality encode boost may be a set of separated block rows or strips as shown in FIG. 5 below with, from frame N to frame N+1 to frame N+2 and so on, the block rows shifting vertically. With such shifting, all locations in the frame are covered after a certain number of frames and the locations may have overlap or no overlap. In another example, the subset region(s) for high quality encode boost may be a set of connected block rows as shown in FIG. 6 below with, from frame N to frame N+1 to frame N+2 and so on, the block row shifting vertically. With such shifting, all locations in the frame are again covered after certain number of frames and the locations may have overlap or no overlap. In yet another example, the subset region(s) for high quality encode boost may be a set of square block groups as shown in FIG. 7 below with, from frame N to frame N+1 to frame N+2 and so on, the square block groups shifting horizontally. Again, with such shifting, all locations in the frame are covered after certain number of frames and the locations may have overlap or no overlap.

FIG. 5 is an illustrative diagram of an example high quality encode region movement across frames 500 for use in low latency video coding, arranged in accordance with at least some implementations of the present disclosure. As shown in FIG. 5, video frame 201 is segmented into high quality encode regions 502 and standard quality encode regions 501, video frame 202 is segmented into high quality encode regions 512 and standard quality encode regions 511, video frame 203 is segmented into high quality encode regions 522 and standard quality encode regions 521, and so on through any number of frames such that the high quality encode regions, across the video frames, move in a downward direction (overlapping or not) until an entirety of a frame 530 is covered by any number of high quality encode regions 532.

In the example of FIG. 5, segmenting temporally adjacent video frames 201-208 into high quality and standard quality encode regions includes segmenting video frame 201 into multiple (i.e., two or more) high quality encode regions 502 such that each of high quality encode regions 502 is a strip extending across a width video frame 201 (i.e., extending continuously from a left edge to a right edge of video frame 201). Standard quality encode regions 501 then make up the remainder of video frame 201. High quality encode regions 502 may have the same vertical heights or the may differ. In some embodiments, one or more of high quality encode regions 502 have a vertical height that matches a largest coding block size of video frame 201. In the context of AVC encode, one or more of high quality encode regions 502 have a vertical height that is 16 pixels (e.g., employing 16×16 macroblocks). In the context of HEVC encode, one or more of high quality encode regions 502 have a vertical height of 32 or 64 pixels (e.g., employing 32×32 or 64×64 coding units). Furthermore, the pitch or spacing between each high quality encode regions 502 may be the same or it may differ.

High quality encode regions 502 may make up any suitable portion of video frame 201. In some embodiments, high quality encode regions 502 cover not more than 20% of the area of video frame 201. In some embodiments, high quality encode regions 502 cover not more than 15% of the area of video frame 201. In some embodiments, high quality encode regions 502 cover 8% to 15% of the area of video frame 201. Although illustrated with respect to horizontal strips of high quality encode regions 502, vertical or diagonal strips (having jagged edges due to block boundaries) may be employed. Furthermore, in the illustrated example, the horizontal strips of high quality encode regions 502 extend from the left edge to the right edge of video frame 201. However, in some embodiments, the strips of high quality encode regions 502 do not extend to one or both of the left and right edges of video frame 201.

Continuing with video frame 202, as shown, a temporally subsequent video frame such as video frame 202 is also segmented into multiple (i.e., two or more) high quality encode regions 512 such that each is a strip extending across at least a portion of video frame 202. As with video frame 201, the remainder of video frame 202 includes standard quality regions 511. High quality encode regions 512 of video frame 202 may have any characteristics discussed with respect to high quality encode regions 502. However, as shown, high quality encode regions 512 are moved in a downward direction relative to high quality encode regions 502. It is noted that although video frames 201, 202 are different frames, such movement of high quality encode regions shown and discussed with respect to video frames 201, 202 and any other video frames herein is relative to a reference video frame (having known reference pixel locations) as known in the art. Similarly, frame 530 illustrating a composite of high quality encode regions 532 is formed relative to overlaying such high quality encode regions 532 in a reference video frame having known reference pixel locations.

In the example of FIG. 5, high quality encode regions 512 are moved relative to high quality encode regions 502 such that each of high quality encode regions 512 has a top that is aligned with a bottom of a corresponding one of high quality encode regions 502 such that no overlap is provided. In other embodiments the top of each of high quality encode regions 512 is above a bottom of each corresponding one of high quality encode regions 502 such that an overlap is provided (e.g., a 12.5% to 25% overlap or the like). Furthermore, high quality encode regions 512 may be moved relative to high quality encode regions 502 in other suitable patterns such as increasing the vertical locations of high quality encode regions 512 (instead of lowering them), changing the sizes or positions of high quality encode regions 512 or the like. In some embodiments, the size and shapes of high quality encode regions 512 are maintained relative to high quality encode regions 502 but the vertical positions thereof are randomized either in a pseudo-random manner such that an order is selected before hand or in real time such that the position of each of high quality encode regions 512 is selected using a random position generator based on remaining available positions in the frame. That is, the position of each of high quality encode regions 512 may be selected so that it does not duplicate a previously used high quality encode region position. Such techniques are compatible with the implementation of overlap. For example, the subsequently chosen positions of high quality encode regions 512 may include positions such that at least a portion of each of high quality encode regions 512 has not been previously quality boosted.

Processing continues in a similar manner with subsequent video frame 203, and so on through any number of frames such as 8, 10, 12, or the like frames until the entirety of the frame has been covered by quality boosted regions. Subsequently, such boosting patterns repeat using the same or different high quality encode region shapes and sizes and/or using the same or different region movements across frames. Notably, providing variety in high quality encode region shapes and sizes and/or movement avoids quality patterns that may be detected by a user.

For example, video frame 203 is segmented into high quality encode regions 522 and remaining standard quality encode regions 521 such that high quality encode regions 522 are moved relative to high quality encode regions 512. Each of high quality encode regions 522 may have a top that is aligned with a bottom of a corresponding one of high quality encode regions 512 such that no overlap is provided or an overlap may be employed. Furthermore, although illustrated with respect to downward movement of each of, high quality encode regions 522, high quality encode regions 522 may be moved relative to high quality encode regions 502 in other suitable patterns as discussed above. Also as discussed, such processing of frames 201, 202, 203 and any number of additional frames continues through any number of frames until the entirety of the frame has been covered by quality boosted regions and then repeats.

FIG. 6 is an illustrative diagram of another example high quality encode region movement across frames 600 for use in low latency video coding, arranged in accordance with at least some implementations of the present disclosure. As shown in FIG. 6, video frame 201 is segmented into high quality encode region 602 and standard quality encode regions 601, video frame 202 is segmented into high quality encode region 612 and standard quality encode regions 611, video frame 203 is segmented into high quality encode region 622 and standard quality encode regions 621, and so on through video frame 205 (in this example), which is segmented into high quality encode regions 632, 633 and a standard quality encode region 631, and through any number of frames such that the high quality encode regions, across the video frames, move in a downward direction (overlapping or not) until an entirety of a frame 640 is covered by any number of high quality encode regions 642.

In the example of FIG. 6, segmenting temporally adjacent video frames 201-208 into high quality and standard quality encode regions includes segmenting video frame 201 into a single high quality encode region 602 such that high quality encode region 602 is a single strip extending across a width video frame 201 and standard quality encode regions 601 make up the remainder of video frame 201. High quality encode region 602 may have any suitable height such as a multiple of a number of largest coding block sizes. In the context of AVC encode, high quality encode region 602 may have a vertical height that is one of 128, 144, or 160 pixels (e.g., employing 8, 9, or 10 16×16 macroblocks) although any suitable height may be used. In the context of HEVC encode, high quality encode region 602 may again have a vertical height that is one of 128, 160, 192, or 224 pixels (e.g., employing 4, 5, 6, or 7 32×32 coding units or 2 or 3 64×64 coding units) although any suitable height may be used.

High quality encode region 602 may make up any suitable portion of video frame 201. In some embodiments, high quality encode region 602 covers not more than 20% of the area of video frame 201. In some embodiments, high quality encode region 602 covers not more than 15% of the area of video frame 201. In some embodiments, high quality encode region 602 covers 8% to 15% of the area of video frame 201. Although illustrated with respect to a horizontal strip, vertical or diagonal strips (having jagged edges due to block boundaries) may be employed. Furthermore, in the illustrated example, high quality encode region 602 extends from the left edge to the right edge of video frame 201. However, in some embodiments, high quality encode region 602 does not extend to one or both of the left and right edges of video frame 201.

Continuing with video frame 202, as shown, a temporally subsequent video frame such as video frame 202 is also segmented into a high quality encode region 612 horizontal strip that extends across at least a portion of video frame 202 and standard quality regions 611. High quality encode region 612 of video frame 202 may have any characteristics discussed with respect to high quality encode region 602 and high quality encode region 612 is moved in a downward vertical direction relative to high quality encode region 602. In FIG. 6, high quality encode region 612 is moved relative to high quality encode region 602 such that no overlap is provided. In other embodiments, an overlap may be provided as discussed with respect to FIG. 5. For example, high quality encode region 612 has a top that is aligned with or overlaps with a bottom of high quality encode region 602.

Furthermore, high quality encode region 612 may be moved relative to high quality encode region 602 in other movement patterns such as increasing the vertical position of high quality encode region 612 (instead of lowering them), changing the size of high quality encode region 612 or the like. In some embodiments, the size and shape of high quality encode region 612 is maintained but the vertical positions thereof is randomized as discussed with respect to FIG. 5. Such randomization may be pseudo-random manner such that an order is selected before hand but in a non-linear pattern or the randomization may be performed in real time such that the position high quality encode region 612 is selected using a random position generator based on remaining available positions in the frame.

Processing continues in a similar manner with subsequent video frame 203, which is segmented into a high quality encode region 602 and remaining standard quality regions 611 into a similar manner, and so on, through video frame 205. As shown with respect to video frame 205, in some embodiments, a high quality encode region may be broken into two high quality encode regions 633 due to a misalignment or overlap of the full size and shape of a high quality encode region with a frame boundary. In such contexts, a first high quality encode region 632 extending form a top of video frame 205 and a second high quality encode region 633 extending from a bottom of video frame 205 are employed such that a sum of the heights of high quality encode regions 632, 633 may match the height of high quality encode region 602, high quality encode region 612, high quality encode region 622, and so on. Such techniques may maintain the proportion of the frame being boosted. In some embodiments, such high quality encode region division is not needed or not employed.

Such processing continues in the same or similar manner and so on through any number of frames such as 8, 10, 12, or the like frames until the entirety of the frame has been covered by quality boosted regions. Subsequently, such boosting patterns repeat using the same or different high quality encode region shapes and sizes and/or using the same or different region movements across frames. Notably, providing variety in high quality encode region shapes and sizes and/or movement avoids quality patterns that may be detected by a user.

FIG. 7 is yet another illustrative diagram of another example high quality encode region movement across frames 700 for use in low latency video coding, arranged in accordance with at least some implementations of the present disclosure. As shown in FIG. 7, video frame 201 is segmented into high quality encode regions 702, 703, 704 and standard quality encode regions 701, video frame 202 is segmented into high quality encode regions 712, 713, 714 and standard quality encode regions 711, video frame 203 is segmented into high quality encode regions 722, 723, 724 and standard quality encode regions 721, and so on through video frame 205 (in this example), which is segmented into high quality encode regions 732, 733, 734, 735 and standard quality encode regions 731, and through any number of frames such that the high quality encode regions, across the video frames, move in a horizontal direction (overlapping or not) until an entirety of a frame (not shown) is covered by any number of high quality encode regions as discussed with respect to FIGS. 5 and 6.

In the example of FIG. 7, segmenting temporally adjacent video frames 201-208 into high quality and standard quality encode regions includes segmenting video frame 201 into any number of high quality encode regions 702, 703, 704 such that each of high quality encode regions 702, 703, 704 is a rectangular region that is contiguous with at least one other region to define a high quality encode pattern within video frame 201. Although illustrated with respect to contiguous high quality encode regions 702, 703, 704, in some embodiments, one or more of high quality encode regions 702, 703, 704 may not share a boarder with another region. Furthermore, although three high quality encode regions 702, 703, 704 are illustrated, any number of regions such as 2, 4, 5, or more may be employed. High quality encode regions 702, 703, 704 may have any suitable height and width such as a height and width that is a multiple of a number of largest coding block size such as 16×16 macroblocks in AVC or 32×32 or 64×64 coding units in HEVC. Furthermore, high quality encode regions 702, 703, 704 may together make up any suitable portion of video frame 201. In some embodiments, high quality encode regions 702, 703, 704 cover not more than 20% of the area of video frame 201. In some embodiments, high quality encode regions 702, 703, 704 cover not more than 15% of the area of video frame 201. In some embodiments, high quality encode regions 702, 703, 704 cover 8% to 15% of the area of video frame 201.

As shown with respect to video frame 202, a temporally subsequent video frame such as video frame 202 is also segmented into high quality encode regions 712, 713, 714 having the same sizes and shapes to define the same high quality encode pattern with respect to video frame 202. The remainder of video frame 202 is made up of standard quality regions 711. High quality encode regions 712, 713, 714 of video frame 202 may have any characteristics discussed with respect to high quality encode regions 702, 703, 704 and, as shown, high quality encode regions 712, 713, 714 are moved in a horizontal right direction. In FIG. 7, high quality encode regions 712, 713, 714 are moved relative to high quality encode regions 702, 703, 704 such that no overlap is provided. In other embodiments, a horizontal overlap may be provided as above. For example, high quality encode regions 712, 713, 714 may each have a left side that is aligned with or overlaps with a right side of corresponding ones of high quality encode regions 702, 703, 704.

Furthermore, high quality encode regions 712, 713, 714 may be moved relative to high quality encode regions 712, 713, 714 in other movement patterns such as horizontal left movement, diagonal movement, changing the size of one or more of high quality encode regions 712, 713, 714 or the like. In some embodiments, the size and shape of each of high quality encode regions 712, 713, 714 is maintained but the positions of one or more of high quality encode regions 712, 713, 714 is randomized as discussed above. For example, the high quality encode pattern defined by high quality encode regions 702, 703, 704 may remain the same or it may change in high quality encode regions 712, 713, 714. Such randomization may be pseudo-random manner such that an order is preselected or it may be performed in real time such that the positions of high quality encode regions 712, 713, 714 are selected using a random position generator based on remaining available positions in the frame.

Processing continues in a similar manner with subsequent video frame 203, which is segmented into a high quality encode high quality encode regions 722, 723, 724 and remaining standard quality regions 721 into a similar manner, and so on, through video frame 205, which is segmented into a high quality encode high quality encode regions 732, 733, 734, 735 and remaining standard quality regions 731. As shown with respect to video frame 205, in some embodiments, a high quality encode region may be broken into two high quality encode regions due to a misalignment or overlap of the full size and shape of a high quality encode region with a frame boundary. In such contexts, a high quality encode region may be divided into two or more high quality encode region summing to the same size as illustrated with respect to the dividing or segmenting a high quality encode region into high quality encode regions 734, 735 (as it would otherwise extend across the right boundary of video frame 205. For example, the overall width of high quality encode regions 734, 735 maintains the width relative to high quality encode regions 704, 714, 724. As discussed above, such techniques may advantageously maintain the proportion of the frame being boosted. In some embodiments, such high quality encode region division is not needed or not employed. Such processing continues in the same or similar manner and so on through any number of frames such as 8, 10, 12, or the like frames until the entirety of the frame has been covered by quality boosted regions and subsequently, such boosting patterns repeat using the same or different high quality encode region shapes and sizes and/or using the same or different region movements across frames.

Returning to FIG. 1, as shown, region based quality boosting encode module 104 receives region data 115, quality boost levels or values 114 for each frame, frame level QPs 113 for each frame, as well as input video 111 and other data, as needed, to encode input video 111 to generate bitstream 117. During encode of input video 111, region based quality boosting encode module 104 applies a video encode quality boost as indicated by quality boost levels or values 114 to the high quality encode region(s) defined within each frame by region data 115.

Such region based quality boosting encode may be performed using any suitable technique or techniques that apply more bits or available bits to the high quality encode region(s) of a frame relative to other regions of the frame. Such other regions may be characterized as low or normal quality encode region(s). In some embodiments, the other regions are encoded using standard encode without a compensatory decrease in encode quality responsive to the high quality encode performed for the high quality encode region(s).

In some embodiments, the high quality encode in the high quality encode region(s) is performed by changing the encode parameters to intentionally increase the quality in the selected high quality encode region(s). In some embodiments, the boosting level is indicated as or converted to a delta QP value (e.g., QP adjustment) that is detected from frame level QP 113 such that the adjusted or reduced QP (frame level QP 113 reduced by the QP adjustment) is used for the encode of high quality encode region(s) while frame level QP 113 is used for the encode of the other (low) quality encode region(s). Therefore, smaller QP is used for the high quality encode region(s) and the quality is boosted. For example, such QPs are used to quantize transformed coefficients as is known in the art.

In some embodiments, the high quality encode in the high quality encode region(s) is performed by adjusting a rate distortion optimization of the first high quality encode region relative to a first standard quality encode region of the first frame Such rate distortion adjustment may be employed using any techniques that provide more bits in the high quality encode region(s) such as reducing the penalty to rate (lowering lambda) in rate distortion optimization. Other techniques may be employed to increase the rate and reduce the distortion in such high quality encode region(s).

Figure 8:
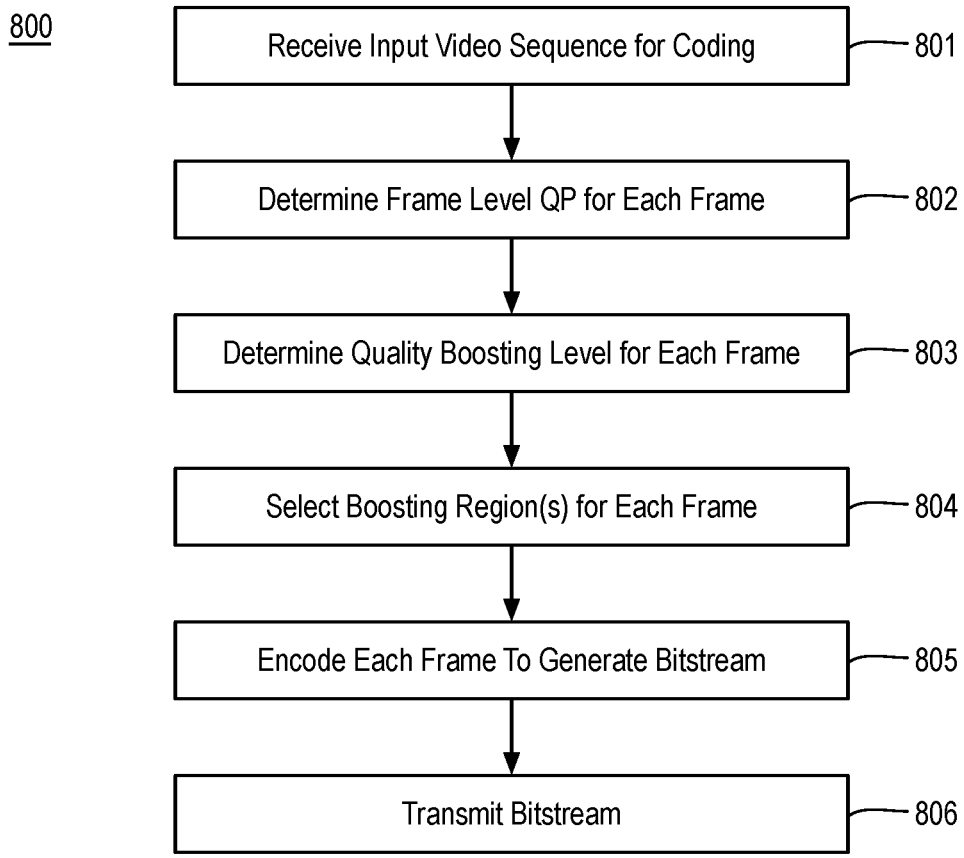
FIG. 8 is a flow diagram illustrating an example process for performing moving region high quality encode in a low latency encode pipeline.

FIG. 8 is a flow diagram illustrating an example process 800 for performing moving region high quality encode in a low latency encode pipeline, arranged in accordance with at least some implementations of the present disclosure. Process 800 may include one or more operations 801-806 as illustrated in FIG. 8. Process 800 may be performed by a device or system (e.g., system 100) to encode a video sequence of temporally adjacent video frames.

Process 800 begins operation 801, where an input video sequence is received for encoding. The input video sequence may include any number of video frames of any resolution and format. In some embodiments, the input video sequence is divided into groups of frames (independent of any group of pictures deployment) such that each group of frames includes a number of sequential temporally adjacent video frames. For each group of video frames, high quality encode regions may be defined for each frame or some frames such that, after deployment within the group, an entirety of a video frame size of the input video sequence has had a high quality encode boost and such that, within each frame having high quality encode region(s), the regions each have a portion thereof that is unique relative to the other high quality encode regions in the other frames in the group. That is, among the group each high quality encode region is applied to a new portion of the video frame size with or without overlap.

Processing continues at operation 802, where a frame level quantization parameter is determined for each frame. In some embodiments, for high quality encode regions within the input video sequence, the high quality encode is implemented via reduction of the frame level QP to a high quality encode QP within the high quality encode regions while applying the frame level QP to the standard or low quality encode regions of the frames (i.e., those regions outside of the high quality encode regions). However, in other embodiments, the high quality encode is provided by otherwise altering the encode within the high quality encode regions to provide more bits relative to the standard or low quality encode regions. Such techniques may include adjusting a rate distortion optimization of the high quality encode region relative to the standard or low quality encode regions, for example.

Processing continues at operation 803, where a quality boosting level is selected or determined for each frame for which high quality encode regions are to be deployed. In some embodiments, a predefined boosting level is applied for scene change or intra frames. In some embodiments, for other frames (e.g., motion estimated and motion compensated frames), a measure of temporal correlation is used to determine an adaptive boosting level such that lower temporal correlation uses a lower boosting level and higher correlation uses a higher boosting level. Any level of granularity may be applied to such temporal correlation level or value to encode quality boosting level or value mapping. In some embodiments, such mapping is made via a monotonically increasing function that maps temporal correlation to encode quality boosting.

Processing continues at operation 804, where one or more boosting regions are selected or determined for each frame for which high quality encode regions are to be deployed. Such boosting regions may have any shapes and sizes discussed herein such as multiple horizontal strips that are translated across the frames, a single horizontal strip that is translated across the frames, an encode pattern or shape (i.e., defined by several rectangular patterns) that is translated across the frames, or outwardly radiating perimeter patterns that radiate out from an initial square or rectangular high quality encode region centered in a first frame. In some embodiments, selecting boosting regions includes randomly selecting such boosting regions from remaining available boosting regions. For example, a number of sets of boosting regions (with one to be deployed for each frame) may be defined that together cover the entirety of the frame over the sets (e.g., 8, 10, or 12 sets). For each frame for which high quality encode regions are to be deployed, one of the sets may be randomly selected and then removed from the pool of available sets. A random set may be selected from the remaining available sets and so on until a last frame is assigned a last available set of boosting regions. In some embodiments, one or more of the sets may be assigned without randomization such as a first set for a first temporal frame in the group of video.

Processing continues at operation 805, where each input frame is encoded using the selected high quality encode regions and quality boosting level or adjustment. As discussed, the encode quality boost is applied to high quality encode regions while the remaining (standard or low quality) region(s) are encoded without the encode quality boost. In some embodiments, the remaining regions are encoded without alteration to the encode process. The input frames may be encoded using any suitable technique or techniques. In an embodiment, the input frames are encoded using a standards compliant encoder to generate a standards compliant bitstream such as a bitstream that is AVC compliant or HEVC compliant.

Processing continues at operation 806, where the bitstream is transmitted for decode and presentation to a user. For example, the bitstream may be transmitted to local memory for storage and eventual transmission to a remote device or the bitstream may be directly transmitted to the remote device. In some embodiments, the bitstream is transmitted in a low latency encode context. For example, the bitstream may be transmitted as part of a video conferencing application, a videotelephony application, a cloud video gaming application, etc.

Process 800 or portions thereof may be repeated any number of times either in series or in parallel for any number input frames or sequences of input video frames. As discussed, process 800 provides for low latency encode pipeline that generates one or more high quality encode regions and a corresponding encode quality boost for each frame. The high quality encode region(s) and encode quality boost may be generated using any suitable technique or techniques discussed herein. As discussed, an input frame is encoded using the high quality encode region(s) and encode quality boost for the input frame to generate at least a portion of a bitstream.

Figure 9:
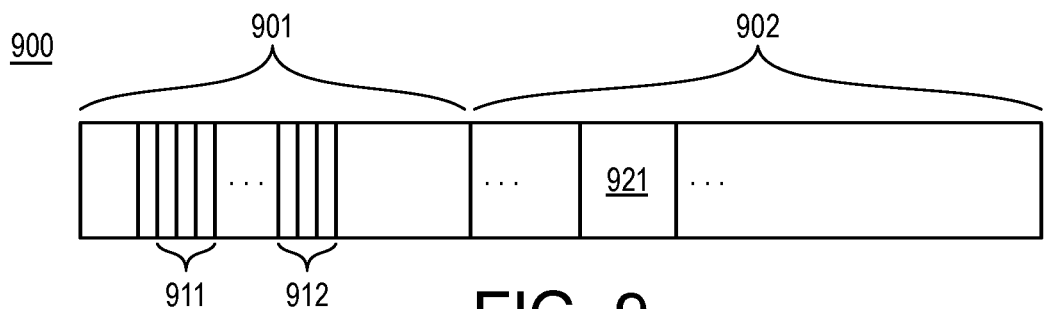
FIG. 9 illustrates an example bitstream.

FIG. 9 illustrates an example bitstream 900, arranged in accordance with at least some implementations of the present disclosure. In some examples, bitstream 900 may correspond to bitstream 117 as illustrated with respect to FIG. 1. As shown in FIG. 9, in some embodiments, bitstream 900 includes a header portion 901 and a data portion 902. In an embodiment, header portion 901 includes a frame header 911 and a slice header 912.

In an embodiment, an indicator or indicators corresponding to a frame level QP as determined using the techniques discussed herein are implemented or inserted in frame header 911. Furthermore, data portion 902 may include encoded frame data 921 for a frame coded using high quality encode region selection and quality boosting techniques discussed herein. In some embodiments, encoded frame data 921 (or header portion 901) includes QP adjustment values corresponding to QP adjustments made in the encode quality boosting of the high quality encode region(s). Frame data 921 includes, for example, encoded quantized transform coefficients, mode selection information, etc. corresponding to the encoded frame. In some embodiments, bitstream 900 is a standards compliant bitstream such that its formatting is standards defined so a decoder that complies with the standard may decode bitstream 900. For example, bitstream 900 may be AVC compliant, HEVC compliant, or compliant with any other standard.

Figure 10:
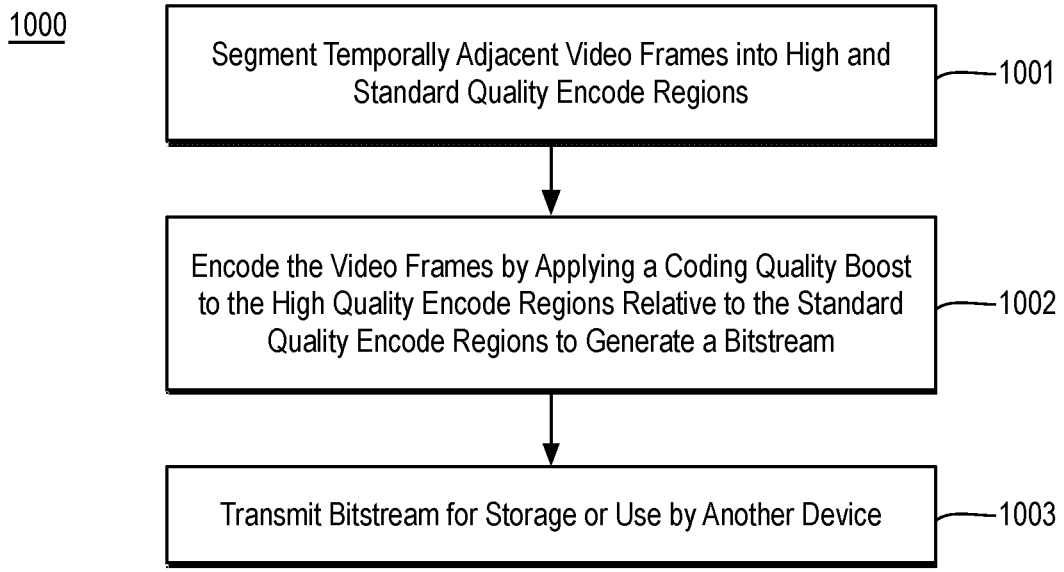
FIG. 10 is a flow diagram illustrating an example process for low latency video coding including applying moving high quality encode regions across temporally adjacent video frames.

FIG. 10 is a flow diagram illustrating an example process 1000 for low latency video coding including applying moving high quality encode regions across temporally adjacent video frames, arranged in accordance with at least some implementations of the present disclosure. Process 1000 may include one or more operations 1001-1003 as illustrated in FIG. 10. Process 1000 may form at least part of a low latency video coding process. By way of non-limiting example, process 1000 may form at least part of a low latency video coding process as performed by any device or system as discussed herein such as system 100. Furthermore, process 1000 will be described herein with reference to system 1100 of FIG. 11.

Figure 11:
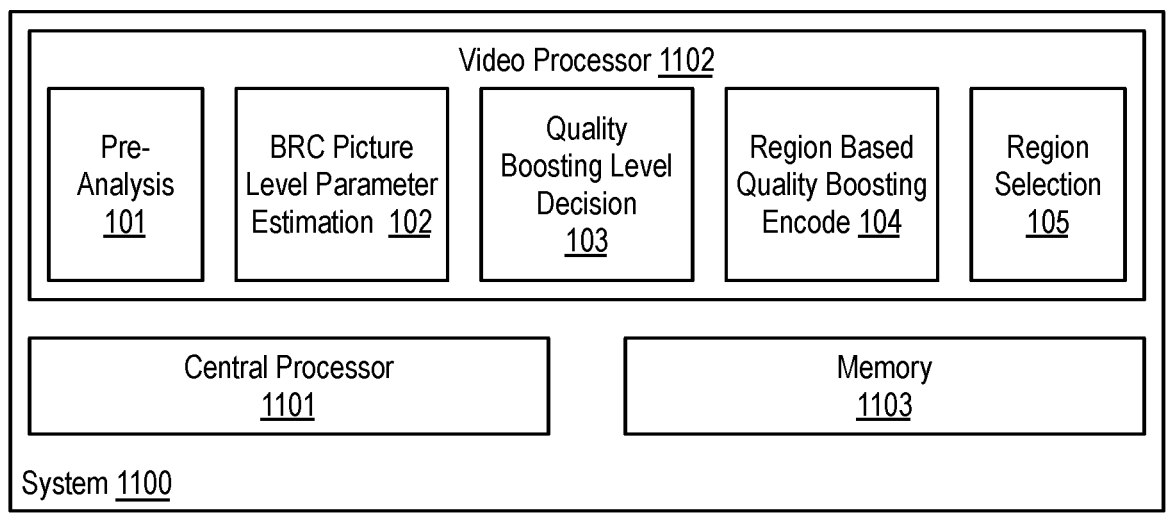
FIG. 11 is an illustrative diagram of an example system for low latency video coding including applying moving high quality encode regions across temporally adjacent video frames.

FIG. 11 is an illustrative diagram of an example system 1100 for low latency video coding including applying moving high quality encode regions across temporally adjacent video frames, arranged in accordance with at least some implementations of the present disclosure. As shown in FIG. 11, system 1100 may include a central processor 1101, a video processor 1102, and a memory 1103. Also as shown, video processor 1102 may include or implement pre-analysis module 101, bit rate control frame level parameter estimation module 102, quality boosting level decision module 103, region based quality boosting encode module 104, and region selection module 105. In an embodiment, memory 1103 stores one or more or portions of video frames for processing. Furthermore, in the example of system 1100, memory 1103 may store video data or related content such as frame data, analytics data, frame level quantization parameters, quality boosting values, region data, bitstream data, and/or any other data as discussed herein.

As shown, in some embodiments, video processor 1102 implements pre-analysis module 101, bit rate control frame level parameter estimation module 102, quality boosting level decision module 103, region based quality boosting encode module 104, and region selection module 105. In some embodiments, one or more or portions of pre-analysis module 101, bit rate control frame level parameter estimation module 102, quality boosting level decision module 103, region based quality boosting encode module 104, and region selection module 105 are implemented by central processor 1101, a graphics processor, or the like.

Video processor 1102 may include any number and type of video, image, or graphics processing units that may provide the operations as discussed herein. Such operations may be implemented via software or hardware or a combination thereof. For example, video processor 1102 may include circuitry dedicated to manipulate frames, frame data, or the like obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory.

In an embodiment, one or more or portions of pre-analysis module 101, bit rate control frame level parameter estimation module 102, quality boosting level decision module 103, region based quality boosting encode module 104, and region selection module 105 are implemented via an execution unit (EU). The EU may include, for example, programmable logic or circuitry such as a logic core or cores that may provide a wide array of programmable logic functions. In an embodiment, one or more or portions of pre-analysis module 101, bit rate control frame level parameter estimation module 102, quality boosting level decision module 103, region based quality boosting encode module 104, and region selection module 105 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where each of a plurality of temporally adjacent video frames are segmented into high quality and standard quality encode regions such that at least a portion of each high quality encode region of each of the video frames is unique to the video frame relative to high quality encode regions of the other temporally adjacent video frames. That is, each encode region includes a portion of a video frame that has not yet been boosted in the temporally adjacent video frames. Furthermore, the terms high quality and standard quality are indicative of an encode quality to be employed relative to one another. The temporally adjacent video frames may be segmented into any suitable high quality and standard quality encode regions using any suitable technique or techniques. In some embodiments, across the temporally adjacent video frames, the high quality encode regions fill an entirety of a video frame size of the plurality of temporally adjacent video frames.

In some embodiments, segmenting each of the adjacent video frames into high quality and standard quality encode regions includes randomly selecting at least one of a location or a size of a first high quality encode region of a first video frame of the adjacent video frames. In some embodiments, randomly selecting the location or size of the first high quality encode region includes random selection from remaining available high quality encode regions not used by one or more video frames prior to the first video frame. In some embodiments, segmenting the temporally adjacent video frames into high quality and standard quality encode regions includes segmenting a first frame into a two or more high quality encode region strips each extending across a width of the first frame and standard quality encode regions comprising a remainder of the first frame. In some embodiments, segmenting the temporally adjacent video frames into high quality and standard quality encode regions includes segmenting a first frame into a single high quality encode region strip extending across a width of the first frame and two standard quality encode regions each extending across the width and from an edge of the high quality encode region strip to an edge of the first frame. In some embodiments, segmenting the temporally adjacent video frames into high quality and standard quality encode regions includes segmenting a first frame into one or more high quality encode region rectangles defining a high quality encode pattern and one or more standard quality encode regions comprising a remainder of the first frame. In some embodiments, segmenting the temporally adjacent video frames into high quality and standard quality encode regions includes segmenting a second frame into a second high quality encode pattern matching a shape of the high quality encode pattern and having a second location in the second frame relative to a first location of the high quality encode pattern in the first frame.

Processing continues at operation 1002, where each of the temporally adjacent video frames are encoded by applying a coding quality boost to the high quality encode regions relative to the standard quality encode regions to generate at least a portion of a bitstream. The coding quality boost for the high quality encode regions may be provided using any suitable technique or techniques. In some embodiments, applying the coding quality boost includes adjusting a frame level quantization parameter (QP) for a first frame of the plurality of adjacent video frames to a high quality region QP and using the high quality region QP to encode a first high quality encode region of the first frame. In some embodiments, applying the coding quality boost includes adjusting a rate distortion optimization of the first high quality encode region relative to a first standard quality encode region of the first frame. Furthermore, the coding quality boost may apply any amount of coding quality boost that may be the same across the temporally adjacent video frames or it may differ. In some embodiments, responsive to a first frame of the adjacent video frames being an intra or scene change frame, a preselected coding quality boost is applied to a first high quality encode region of the first frame and a second high quality encode region of a second frame subsequent to the first frame applies an adaptive coding quality boost based on a temporal correlation of the second frame. In some embodiments, a third frame subsequent to the first frame applies a second adaptive coding quality boost based on a second temporal correlation of the third frame, such that the second adaptive coding quality boost is less than the adaptive coding quality boost responsive to the second temporal correlation being less than the temporal correlation.

Processing continues at operation 1003, where the bitstream is transmitted for eventual decode and presentation to a user. In some embodiments, the bitstream is transmitted to memory for storage and eventual transmission to a remote device. In some embodiments, the bitstream is transmitted to a remote device in a low latency encode context such as a video conferencing context, videotelephony context, or a cloud video gaming context. However the bitstream may be transmitted to any device for decode. As discussed, in some embodiments, such segmenting and coding quality boost processing repeats for subsequent numbers of video frames. In some embodiments, process 1000 further includes segmenting each of a number of temporally adjacent second video frames, immediately subsequent to the temporally adjacent video frames, into second high quality and standard quality encode regions, such that at least a portion of each second high quality encode region of each of the second video frames is unique to the video frame relative to the other temporally adjacent second video frames and, across the plurality of temporally adjacent second video frames, the second high quality encode regions fill an entirety of the video frame size. Such subsequent segmentation and encode may use the same or different regions, sizes, and boosting levels with respect to the prior segmentation and encode.

Process 1000 may be repeated any number of times either in series or in parallel for any number of frames. As discussed, process 800 may provide for low latency video encoding including applying moving high quality encode regions across temporally adjacent video frames.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations of process 800 or others discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a non-transitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
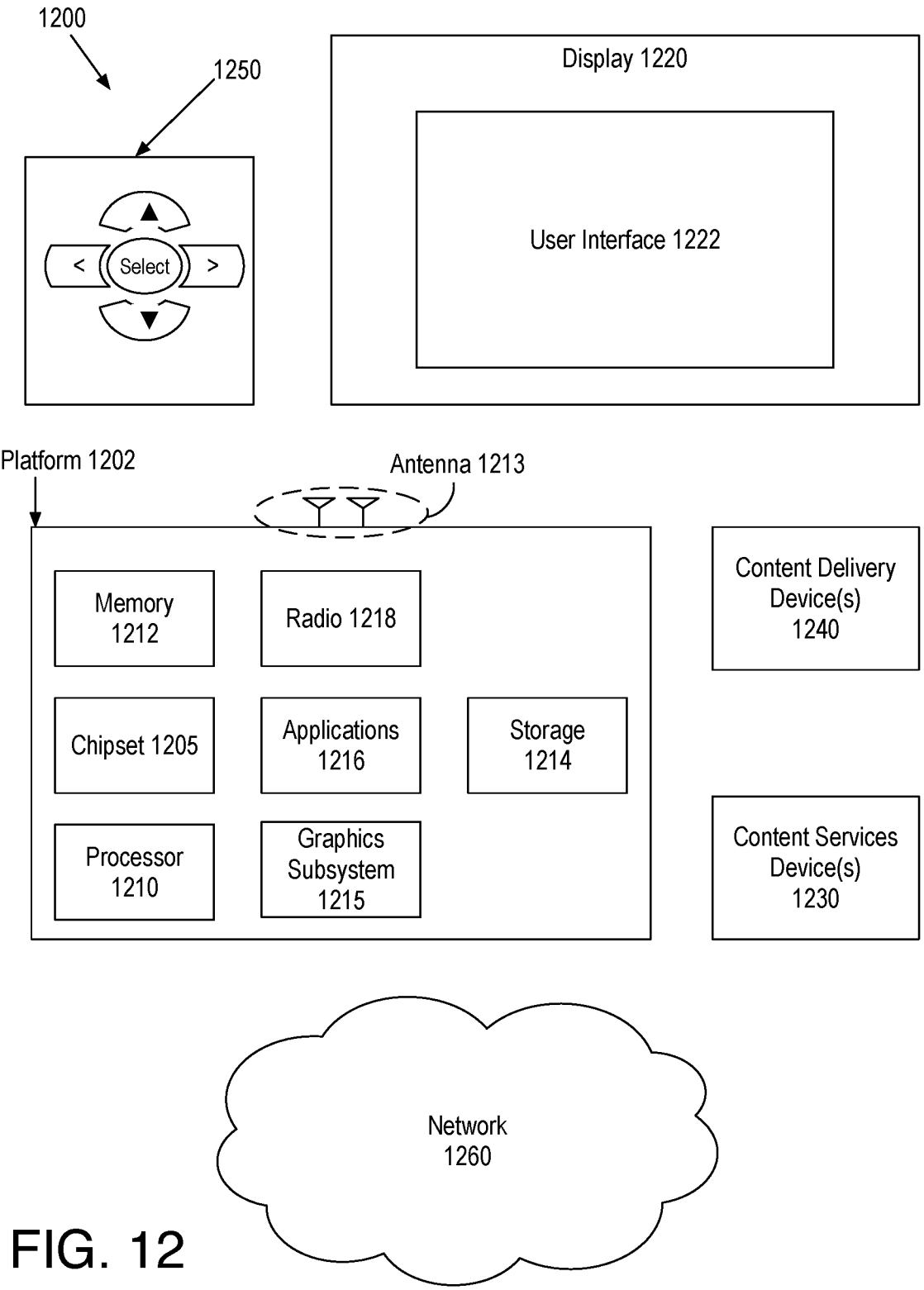
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or hi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of may be used to interact with user interface 1222, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1220) by movements of a pointer, cursor, focus ring, or other visual indicators displayed on the display. For example, under the control of software applications 1216, the navigation features located on navigation may be mapped to virtual navigation features displayed on user interface 1222, for example. In various embodiments, may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
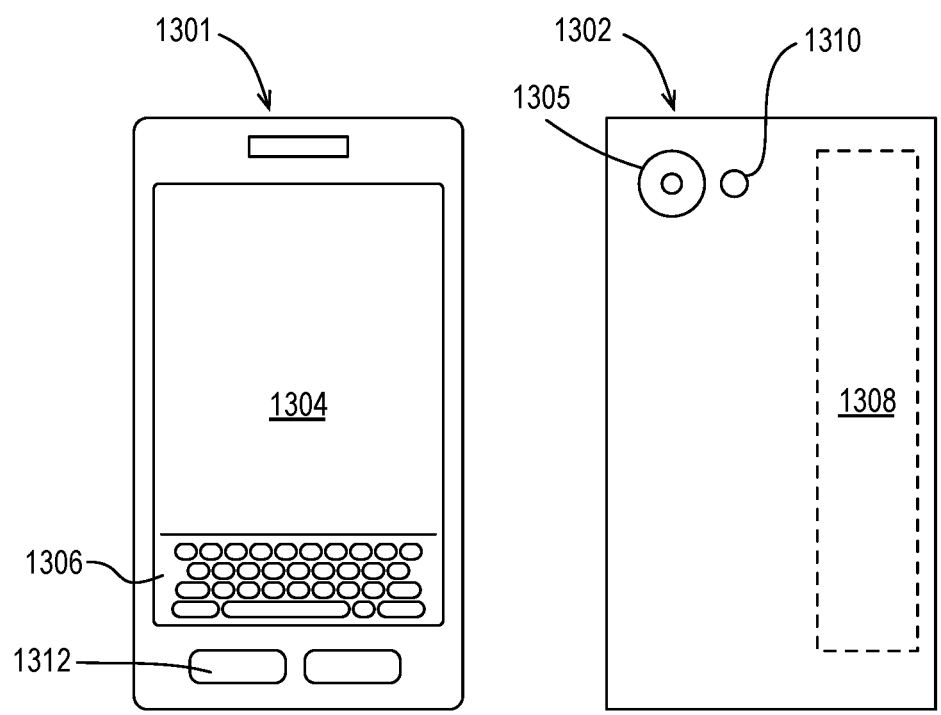
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, system 100 or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for low latency video encoding comprises segmenting each of a plurality of temporally adjacent video frames into high quality and standard quality encode regions, wherein at least a portion of each high quality encode region of each of the video frames is unique to the video frame relative to high quality encode regions of the other temporally adjacent video frames, encoding each of the temporally adjacent video frames by applying a coding quality boost to the high quality encode regions relative to the standard quality encode regions to generate at least a portion of a bitstream, and transmitting the bitstream.

In one or more second embodiments, further to the first embodiment, across the plurality of temporally adjacent video frames, the high quality encode regions fill an entirety of a video frame size of the plurality of temporally adjacent video frames.

In one or more third embodiments, further to the first or second embodiments, the method further comprises segmenting each of a plurality of temporally adjacent second video frames, immediately subsequent to the temporally adjacent video frames, into second high quality and standard quality encode regions, wherein at least a portion of each second high quality encode region of each of the second video frames is unique to the video frame relative to the other temporally adjacent second video frames and, across the plurality of temporally adjacent second video frames, the second high quality encode regions fill an entirety of the video frame size.

In one or more fourth embodiments, further to any of the first through third embodiments, applying the coding quality boost comprises one of adjusting a frame level quantization parameter (QP) for a first frame of the plurality of adjacent video frames to a high quality region QP and using the high quality region QP to encode a first high quality encode region of the first frame or adjusting a rate distortion optimization of the first high quality encode region relative to a first standard quality encode region of the first frame.

In one or more fifth embodiments, further to any of the first through fourth embodiments, responsive to a first frame of the plurality of adjacent video frames being an intra or scene change frame, a preselected coding quality boost is applied to a first high quality encode region of the first frame and a second high quality encode region of a second frame subsequent to the first frame applies an adaptive coding quality boost based on a temporal correlation of the second frame.

In one or more sixth embodiments, further to any of the first through fifth embodiments, a third frame subsequent to the first frame applies a second adaptive coding quality boost based on a second temporal correlation of the third frame, wherein the second adaptive coding quality boost is less than the adaptive coding quality boost responsive to the second temporal correlation being less than the temporal correlation.

In one or more seventh embodiments, further to any of the first through sixth embodiments, segmenting each of the adjacent video frames into high quality and standard quality encode regions comprises randomly selecting at least one of a location or a size of a first high quality encode region of a first video frame of the adjacent video frames.

In one or more eighth embodiments, further to any of the first through seventh embodiments, randomly selecting the location or size of the first high quality encode region comprises random selection from remaining available high quality encode regions not used by one or more video frames prior to the first video frame.

In one or more ninth embodiments, further to any of the first through eighth embodiments, segmenting the plurality of temporally adjacent video frames into high quality and standard quality encode regions comprises segmenting a first frame into a two or more high quality encode region strips each extending across a width of the first frame and standard quality encode regions comprising a remainder of the first frame.

In one or more tenth embodiments, further to any of the first through ninth embodiments, segmenting the plurality of temporally adjacent video frames into high quality and standard quality encode regions comprises segmenting a first frame into a single high quality encode region strip extending across a width of the first frame and two standard quality encode regions each extending across the width and from an edge of the high quality encode region strip to an edge of the first frame.

In one or more eleventh embodiments, further to any of the first through tenth embodiments, segmenting the plurality of temporally adjacent video frames into high quality and standard quality encode regions comprises segmenting a first frame into one or more high quality encode region rectangles defining a high quality encode pattern and one or more standard quality encode regions comprising a remainder of the first frame.

In one or more twelfth embodiments, further to any of the first through eleventh embodiments, segmenting the plurality of temporally adjacent video frames into high quality and standard quality encode regions comprises segmenting a second frame into a second high quality encode pattern matching a shape of the high quality encode pattern and having a second location in the second frame relative to a first location of the high quality encode pattern in the first frame.

In one or more thirteenth embodiments, a device or system includes a memory and one or more processors to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of a plurality of temporally adjacent video frames, the temporally adjacent video frames include a first video frame, one or more second video frames that are temporally previous to the first video frame, and an intra or scene change frame; and
one or more processors coupled to the memory, the one or more processors to:
segment each of the plurality of temporally adjacent video frames into high quality and standard quality encode regions, wherein at least a portion of each high quality encode region of each of the video frames is unique to the video frame relative to high quality encode regions of other temporally adjacent video frames;
determine a first temporal correlation value for the first video frame based on a first temporal correlation between the first video frame and the one or more second video frames;
determine a first coding quality boost based on the first temporal correlation value;
encode the first video frame by applying the first a coding quality boost to one or more first high quality encode regions of the first video frame relative to one or more first standard quality encode regions of the first video frame to generate at least a portion of a bitstream;
determine a predetermined coding quality boost for the intra or scene change frame;
encode the intra or scene change frame by applying the predetermined coding quality boost to one or more second high quality encode regions of the intra or scene change frame relative to one or more second standard quality encode regions of the intra or scene change frame to generate at least a second portion of the bitstream; and
transmit the portion of the bitstream.

2. The system of claim 1, wherein, across the plurality of temporally adjacent video frames, the high quality encode regions fill an entirety of a video frame size of the plurality of temporally adjacent video frames.

3. The system of claim 2, the one or more processors to:
segment each of a plurality of temporally adjacent second video frames, immediately subsequent to the temporally adjacent video frames, into second high quality and standard quality encode regions, wherein at least a portion of each second high quality encode region of each of the second video frames is unique to the video frame relative to other temporally adjacent second video frames and, across the plurality of temporally adjacent second video frames, the second high quality encode regions fill an entirety of the video frame size.

4. The system of claim 1, wherein applying the first coding quality boost comprises adjusting a frame level quantization parameter (QP) for the first video frame to a high quality region QP and use the high quality region QP to encode the one or more first high quality encode regions of the first video frame or the one or more processors to adjust a rate distortion optimization of the one or more first high quality encode regions relative to the one or more first standard quality encode regions of the first video frame.

5. The system of claim 1, wherein:
the temporally adjacent video frames include a third video frame and one or more fourth video frames that are temporally previous to the third video frame;
the one or more processors are further to:
determine a second temporal correlation value for the third video frame based on a second temporal correlation between the third video frame and the one or more fourth video frames; and
determine a second coding quality boost based on the second temporal correlation value;
the second temporal correlation value is higher than the first temporal correlation value; and
the second coding quality boost is higher than the first coding quality boost.

6. The system of claim 1, wherein segmenting each of the temporally adjacent video frames into high quality and standard quality encode regions comprises randomly selecting at least one of a location or a size of the one or more first high quality encode regions of the first video frame.

7. The system of claim 6, wherein randomly selecting the location or size of the one or more first high quality encode regions comprises randomly selecting from remaining available high quality encode regions not used by one or more video frames prior to the first video frame.

8. The system of claim 1, wherein the one or more first high quality encode regions of the first video frame comprises two or more strips each extending across a width of the first video frame and the one or more first standard quality encode regions of the first video frame comprise a remainder of the first video frame.

9. The system of claim 1, wherein the one or more first high quality encode regions of the first video frame comprise a single strip extending across a width of the first video frame and the one or more first standard quality encode regions comprise two regions each extending across the width and from an edge of the single strip to an edge of the first video frame.

10. The system of claim 1, wherein the one or more first high quality encode regions comprise one or more rectangles defining a high quality encode pattern and the one or more first standard quality encode regions comprise a remainder of the first video frame.

11. The system of claim 10, wherein segmenting each of the plurality of temporally adjacent video frames into high quality and standard quality encode regions comprises segmenting a fifth video frame of the temporally adjacent video frames into a second high quality encode pattern matching a shape of the high quality encode pattern and having a second location in the fifth video frame relative to a first location of the high quality encode pattern in the first video frame.

12. A method comprising:
segmenting each of a plurality of temporally adjacent video frames into high quality and standard quality encode regions, wherein the temporally adjacent video frames include a first video frame, one or more second video frames that are temporally previous to the first video frame, a third video frame, and one or more fourth video frames that are temporally previous to the third video frame and at least a portion of each high quality encode region of each of the video frames is unique to the video frame relative to high quality encode regions of other temporally adjacent video frames;

determining a first temporal correlation value for the first video frame based on a first temporal correlation between the first video frame and the one or more second video frames;

determining a first coding quality boost based on the first temporal correlation value;

encoding the first video frame by applying the first coding quality boost to one or more first high quality encode regions of the first video frame relative to one or more first standard quality encode regions of the first video frame to generate at least a first portion of a bitstream;

determining a second temporal correlation value for the third video frame based on a second temporal correlation between the third video frame and the one or more fourth video frames, the second temporal correlation value being different from the first temporal correlation value;

determining a second coding quality boost based on the second temporal correlation value, the second coding quality boost being different from the first coding quality boost;

encoding the third video frame by applying the second coding quality boost to one or more second high quality encode regions of the third video frame relative to one or more second standard quality encode regions of the third video frame to generate at least a second portion of the bitstream; and transmitting the bitstream.

13. The method of claim 12, wherein, across the plurality of temporally adjacent video frames, the high quality encode regions fill an entirety of a video frame size of the plurality of temporally adjacent video frames.

14. The method of claim 12, wherein applying the first coding quality boost comprises one of adjusting a frame level quantization parameter (QP) for the first video frame to a high quality region QP and using the high quality region QP to encode the one or more first high quality encode regions of the first video frame or adjusting a rate distortion optimization of the one or more first high quality encode regions relative to the one or more first standard quality encode regions of the first video frame.

15. The method of claim 12, wherein:
the temporally adjacent video frames include an intra or scene change frame; and
the method further comprises:
determining a predetermined coding quality boost for the intra or scene change frame; and
encoding the intra or scene change frame by applying the predetermined coding quality boost to one or more third high quality encode regions of the intra or scene change frame relative to one or more third standard quality encode regions of the intra or scene change frame to generate at least a third portion of the bitstream.

16. The method of claim 12, wherein segmenting each of the adjacent video frames into high quality and standard quality encode regions comprises randomly selecting at least one of a location or a size of the one or more first high quality encode regions of the first video frame.

17. At least one machine readable medium comprising a plurality of instructions that, in response to being executed on a computing device, cause the computing device to perform low latency video coding by:
segmenting each of a plurality of temporally adjacent video frames into high quality and standard quality encode regions, wherein the temporally adjacent video frames include a first video frame, one or more second video frames that are temporally previous to the first video frame, a third video frame, and one or more fourth video frames that are temporally previous to the third video frame and at least a portion of each high quality encode region of each of the video frames is unique to the video frame relative to high quality encode regions of other temporally adjacent video frames;

determining a first coding quality boost for the first video frame and determining a second coding quality boost that is different from the first coding quality boost for the third video frame based on a first temporal correlation between the first video frame and the one or more second video frames being different from a second temporal correlation between the third video frame and the one or more fourth video frames;

encoding the first video frame by applying the first coding quality boost to one or more first high quality encode regions of the first video frame relative to one or more first standard quality encode regions of the first video frame to generate at least a first portion of a bitstream;

encoding the third video frame by applying the second coding quality boost to one or more second high quality encode regions of the third video frame relative to one or more second standard quality encode regions of the third video frame to generate at least a second portion of the bitstream; and transmitting the bitstream.

18. The at least one machine readable medium of claim 17, wherein, across the plurality of temporally adjacent video frames, the high quality encode regions fill an entirety of a video frame size of the plurality of temporally adjacent video frames.

19. The at least one machine readable medium of claim 17, wherein applying the first coding quality boost comprises one of adjusting a frame level quantization parameter (QP) for the first video frame to a high quality region QP and using the high quality region QP to encode the one or more first high quality encode regions of the first video frame or adjusting a rate distortion optimization of the one or more first high quality encode regions relative to the one or more first standard quality encode regions of the first video frame.

20. The at least one machine readable medium of claim 17, wherein:
the temporally adjacent video frames include an intra or scene change frame; and
the instructions cause the computing device to further:
determine a predetermined coding quality boost for the intra or scene change frame; and
encode the intra or scene change frame by applying the predetermined coding quality boost to one or more third high quality encode regions of the intra or scene change frame relative to one or more third standard quality encode regions of the intra or scene change frame to generate at least a third portion of the bitstream.

21. The at least one machine readable medium of claim 17, wherein segmenting each of the temporally adjacent video frames into high quality and standard quality encode regions comprises randomly selecting at least one of a location or a size of the one or more first high quality encode regions of the first video frame.

22. The at least one machine readable medium of claim 17, wherein the first temporal correlation is greater than a first threshold, the second temporal correlation is greater than a second threshold, the first threshold is greater than the second threshold, and the first coding quality boost is greater than the second coding quality boost.

\* \* \* \* \*